Nov. 1, 1938.  L. NOLTE  2,135,313
TEAPOT
Filed Aug. 11, 1937
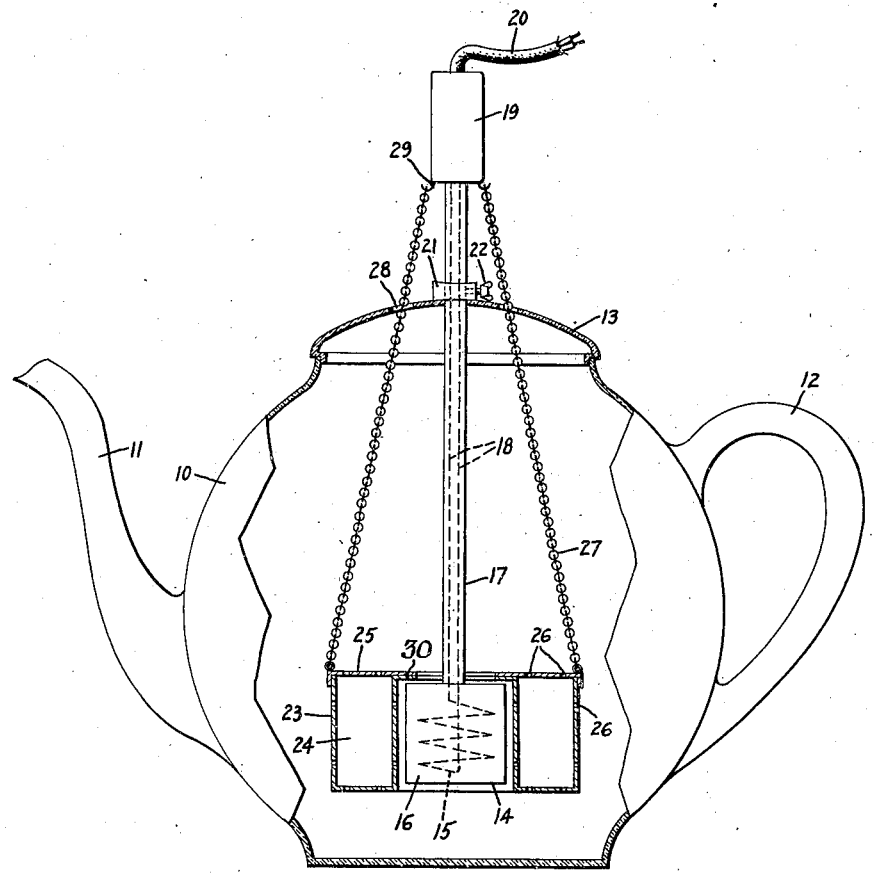
Inventor:
Ludwig Nolte,
by  Harry E. Dunham
His Attorney.

Patented Nov. 1, 1938

2,135,313

UNITED STATES PATENT OFFICE 2,135,313

TEAPOT

Ludwig Nolte, Nuremberg, Germany, assignor to General Electric Company, a corporation of New York Application August 11, 1937, Serial No. 158,571 In Germany September 11, 1936

3 Claims. (Cl. 219—41)

This invention relates to teapots and the like, and it has for its object the provision of an improved device of this character.

While this invention has more general application, it is particularly adapted to teapots having steeping vessels made of a ceramic material. In certain of the teapots of this character heretofore used the heating element was fitted in the bottom of the vessel. This necessitated a vessel having a relatively fixed bottom in order to avoid danger of breaking due to heat stresses. This reduced the efficiency of the heating element. In order to improve the efficiency it was proposed to make the bottom of the vessel of metal but this had the disadvantage that it was rather difficult to obtain a liquid-tight joint between the metallic bottom and the ceramic top of the vessel.

In accordance with this invention, the teapot is provided with an immersion steeping vessel which is formed entirely of porcelain. It is to be understood, however, that it may also be formed of metal if the latter material be desired. Arranged within the steeping vessel is an immersion heating device, and also a tea strainer. These members are supported so that they may be adjusted independently of each other to different depths of immersion within the steeping vessel. Preferably, the heating element will be mounted on a suitable support that in turn is mounted in the lid of the steeping vessel; the strainer also will be mounted on the support, but will be so arranged that it can be adjusted independently of the heating unit.

For a more complete understanding of this invention, reference should be had to the accompanying drawing in which the single figure is an elevation mainly in section illustrating a teapot arranged in accordance with this invention.

Referring to the drawing, this invention has been shown as applied to a teapot having a steeping vessel 10 made of a suitable ceramic material. The steeping vessel 10 is provided with a pouring spout 11 and a handle 12. It is also provided with a lid 13 which may be made either of porcelain or metal.

A suitable immersion heating device 14 is arranged to be inserted into the steeping vessel 10. The heating element 14 may be of any suitable construction, the details of which form no part of this invention. Briefly, however, it will comprise a suitable resistance conductor 15 which is supported in a casing 16 and which will be insulated from the casing in any suitable manner.

The heating element 14 is mounted upon a suitable rod-like supporting member 17 which is inserted through an aperture provided for it in the lid 13, as shown. Preferably, suitable electrical supply leads 18 for the resistance conductor will be directed upwardly through the support 17 to the top thereof where a suitable terminal plug 19 is located. As shown, an electrical supply lead 20 enters this plug.

The support 17 is adjustably mounted in the lid 13 so as to vary the depth of immersion of the heating element 14 by means of a suitable collar 21 surrounding the support and adapted to bear upon the surface of the lid 13, as shown. The collar 21 is secured to the support 17 by means of a set screw 22. It will be observed that the position of the support with reference to the steeping vessel may be adjusted merely by varying the position of the collar 21 on the support.

Surrounding the heating element 14 is a circular tea strainer 23 which, as shown, has an annular chamber 24 for receiving the tea or other substance to be steeped. The strainer is closed by a lid 25. The inner and outer walls as well as the bottom wall of the chamber and the lid are provided with a plurality of apertures 26 permitting the water to circulate freely through the chamber.

The lid 25 is secured to the support 17 by means of a pair of chains 27, which as shown are directed upwardly through spaced apertures 28 provided in the lid, and at their upper ends are arranged to be fastened onto hooks 29 secured to the plug 19. It will be understood that the lid will have a tight sliding fit with the strainer body 23 so that the lid will support the body in suspended position below it. Any other suitable fastening means between the lid and the strainer may be provided, such as a screw or bayonet joint (not shown).

Preferably, the strainer 23 will be provided with a circular stop 30 arranged to engage the upper surface of the heater 14 so that the strainer may not be immersed to a lower depth than the heater.

In the operation of the device it will be understood that water will be placed in the steeping vessel 10 and that its temperature will be raised by means of the immersion heating element 14 which will be placed to a suitable depth in the water, such as the position it has in the drawing. While the water is being heated the strainer 23 will be supported in an elevated position above the level of the water by the chains 27. When the water has been heated substantially to the boiling point the heating element will be deenergized by means of a suitable switch (not shown)

connected in the cord 20, and then the strainer will be moved down to its position to surround the heating element 14, where it is supported by the chains 27, as before. When the strainer 23 has been immersed for a length of time sufficient to give a beverage of the desired strength, the support 22 is elevated which operation lifts not only the heating element 14 but also the strainer.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. A device for making tea and the like comprising a steeping vessel, an immersion heater and a strainer for the tea within said vessel adapted to be positioned in concentric relation with each other, means for separately adjusting the positions of said heater and strainer to different levels within said steeping vessel, and stop means between said strainer and heating element preventing adjustment of said heater to a higher level than said strainer and adjustment of said strainer to a lower level than said heater.

2. A device for making tea and the like comprising a steeping vessel having a lid covering it, a support directed through said lid, a heating element on the lower end of said support, an adjustable stop on said support above said lid adapted to engage the lid to support said heating element at the desired depth, a strainer in said vessel, chains attached to said strainer and directed upwardly through said lid, and hooks on said support above the lid adapted to receive the links of said chains to support said strainer.

3. Apparatus for making tea and the like comprising a steeping vessel, an immersion heating element in said vessel, a support for said heating element directed upwardly through the top of said vessel, means for adjusting the position of said support and thereby the level of the heating element within said steeping vessel, a circular strainer in said vessel adapted to surround said heating element and support, means for adjustably securing said strainer to said support so that it can be held at selected levels above said heating element and a stop on said strainer over said heating element whereby the latter cannot be withdrawn upwardly through the strainer to a higher level than the strainer.

LUDWIG NOLTE.